G. FINCKEN.

Sugar Draining Apparatus.

No. 1,501.

Reissued June 23, 1863.

N. PETERS, Photo-Lithographer, Washington, D. C.

UNITED STATES PATENT OFFICE.

GUSTAVUS FINKEN, OF NEW YORK, N. Y.

IMPROVED SUGAR-DRAINING APPARATUS.

Specification forming part of Letters Patent No. 16,051, dated November 11, 1856; Reissue No. 1,501, dated June 23, 1863.

*To all whom it may concern:*

Be it known that I, GUSTAVUS FINKEN, formerly of the city of Brooklyn, in the county of Kings and State of New York, now of the city, county, and State of New York, have invented a new and useful Improvement in Apparatus for Draining Sugar; and I do hereby declare that the following is a full, clear, and exact description of the same, reference being had to the accompanying drawings, forming part of this specification.

The principal object of my invention is to save the very heavy labor of carrying the sugar in ladles from the cooler to the molds in which the draining and crystallization is effected, and pouring it into the molds by hand, as hitherto universally practiced in sugar-refineries, and to enable the molds to be filled directly from the cooler; and to this end it consists in the employment, for the reception of the molds, of wheel-carriages so constructed as to hold several molds in upright positions, and to be capable of being run under the cooler for the purpose of filling the molds directly therefrom, and of being run away to a convenient place for the draining to be performed.

It also consists in furnishing such a carriage, with a number of movable stoppers corresponding with the number of molds it is to contain, and so arranged and applied as to be capable of being operated by one or more levers or their equivalent outside of the carriage, for the purpose of closing up the bottom of the molds at the time of filling, and of opening them for draining.

It further consists in furnishing in such a carriage, below the seats which receive the bottoms of the molds, a vacuum-chamber, in which a vacuum is to be obtained by any suitable means for the purpose of expediting the process of draining by the aid of the pressure of the atmosphere on the upper surface of the sugar in the mold.

To enable others skilled in the art to make and use my invention, I will proceed to describe its construction and operation with reference to the drawings.

Figure 3:
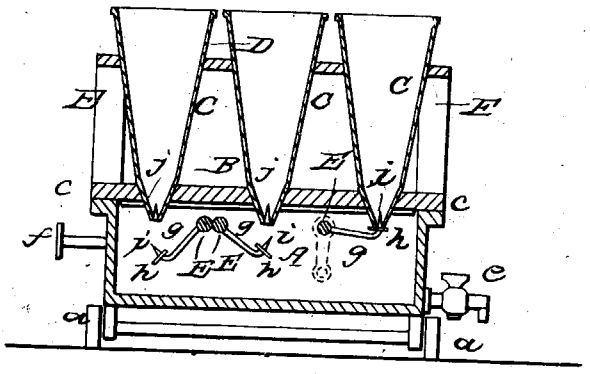
Figure 1:
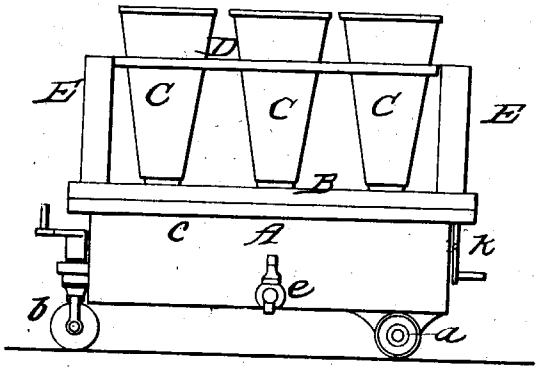
Figure 2:
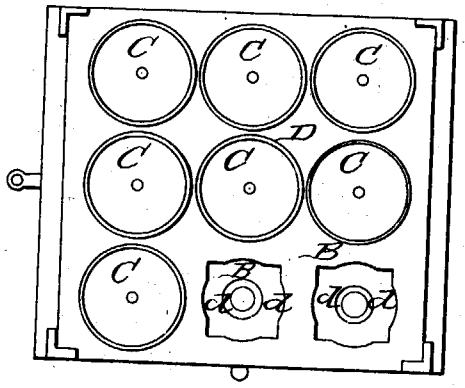

Figure 1 is a side view of a mold-carriage containing several molds. Fig. 2 is a plan of the same, and Fig. 3 a transverse vertical section of the same.

Similar letters of reference in the several figures indicate corresponding parts.

A is a quadrangular box, of cast iron or other material, constituting the lower portion or body of the mold-carriage, mounted on a pair of wheels, *a a*, and a third wheel, *b*, which is a guiding-wheel. B is a plate forming a cover to the box A, and secured to the flanges *c c* thereof by bolts. This plate contains a number of conical seats, *d d*, arranged in rows to receive the conical bottoms of the molds C C, two of which seats are exposed to view in the plan, Fig. 2, by the omission of two molds from the carriage. D is a frame or plate containing openings for the reception of the upper parts of the molds, supported upon parts E E, and serving to hold the molds upright when resting on their seats in the plate B. The box A is furnished with a cock, *e*, near the bottom to draw off the sirup when the drawing is to be performed in the carriage itself; and if the pressure of the atmosphere is to be made use of to extrude the sirup from the sugar, the said box is furnished with a nozzle, as represented at *f* in Fig. 3, and suitable means of connecting the said nozzle with a pipe leading to an air-pump, or other means of exhausting the air from the box, and so converting it into a vacuum-chamber.

F F are shafts fitted to work in bearings in the sides or ends of the box A, fitted to work in bearings in the sides or ends of the vessel, each carrying arms *g*, corresponding in number with the mold-seats in each row, and arranged under the mold-seats. To the ends of these arms are attached the stoppers *h h*, by which the holes in the bottoms of the molds are closed up previously to the filling. Each shaft F is furnished with a crank or lever, *k*, outside of the box A, by which it can be moved to bring all the stoppers attached to it in operation at one and the same time to close or open the holes in the bottoms of their respective molds. These stoppers are made, like valves, to fit round the holes in the molds, but are provided each with a long and pointed pin, *i*, to enter some distance into the mold, as shown at the extreme right-hand mold in Fig. 2, in order that when withdrawn from the molds at the proper time they may leave cavities in the sugar of the form shown at *j j* in two of the molds in Fig. 3, from which the stoppers are supposed to have been withdrawn. These cavities in the sugar, which are for the purpose of leaving a comparatively-large surface for the sirup to drain through, are generally formed by a hand-punch after the removal of the stoppers from the molds; but by attaching a pin, *i*, to each stopper the labor of punching the molds one at a time is dispensed with.

In order to insure the stoppers coming exactly into the centers of the holes in the molds and fitting properly when inserted thereinto, they may be attached to the arms *g g* by some kind of joint which allows a limited movement in any direction.

The mode of operation of this carriage is as follows: The carriage having as many molds placed within it as it is capable of carrying, and the stoppers being inserted in the holes of their respective molds, the carriage is wheeled up to and under the cooler from whence the molds are to be filled, and moved to bring each of the molds in turn under the faucet or other outlet of the cooler, and when all the molds have been filled the carriage is wheeled away to any convenient place and another carriage of molds brought to the cooler. The carriages containing the filled molds may be arranged close together, and the crystallization and draining of the sugar are effected in the carriages thus arranged without occupying more room than by the ordinary arrangement of the molds in stationary frames; but to obviate the necessity of providing so many carriages they may be employed merely to transport the molds to and from the cooler and the place of draining, the molds in such case to be removed from the carriage and placed in frames or on pots to drain. In either case the very heavy labor of carrying the sugar in ladles from the cooler to the molds, many of which must be at a considerable distance from the cooler, is dispensed with. This saving of labor has been found in practice to be of such immense importance to sugar-refiners that a disposition has been shown by them to adopt it universally as soon as the invention has been made known to them. The draining need not be performed on the same floor with the cooler, as the carriages may be wheeled to a hoistway and raised or lowered by a suitable apparatus to another floor, and then run to the place of draining. If the draining be performed in the carriage itself, when the sugar has stood long enough in the molds, the stoppers are all removed at once by simply moving the cranks or levers on the ends of the shafts F F to the proper position, and the draining then commences. Spouts or conductors are to be placed under the cocks *e*, to allow the sirup to be drawn from the box A and conveyed to a suitable receptacle, when the draining is performed in the carriages themselves. If atmospheric pressure is to be used to drive out the sirup, connection can be made from an air-exhausting pump to any number of the boxes A by pipes and union-joints at *f f*. In that case the seats *d d* should be lined with india-rubber, to make an air-tight connection between the molds and the box A.

What I claim as my invention, and desire to secure by Letters Patent, is—

1. The employment, for the purpose of carrying sugar-molds to the cooler or cistern from which they are filled, of containing them while being filled, and of transporting the filled molds to a convenient place for draining, of a wheel-carriage constructed with suitable seats, and means of holding several molds in an upright position, substantially as herein described, whereby I effect the saving of labor herein explained.

2. Furnishing such a carriage, as is hereinabove specified, with movable mold-stoppers applied to be operated by means of one or more levers or their equivalent outside of the carriage, substantially as and for the purpose herein specified.

3. Providing in such a carriage as is hereinbefore specified a vacuum-chamber for the connection of an air-pump or its equivalent, substantially as and for the purpose herein specified.

GUST. FINKEN.

Witnesses:
DANIEL ROBERTSON,
M. M. LIVINGSTON.